US 9,001,773 B2

(12) United States Patent
Jeon et al.

(10) Patent No.: US 9,001,773 B2
(45) Date of Patent: *Apr. 7, 2015

(54) METHOD OF CHANNEL ASSESSMENT AND CHANNEL SEARCHING IN A WIRELESS NETWORK

(71) Applicant: LG Electronics Inc., Seoul (KR)

(72) Inventors: Beom Jin Jeon, Seoul (KR); Taek Soo Kim, Seoul (KR); Hyeon Cheol Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,708

(22) Filed: Sep. 24, 2013

(65) Prior Publication Data

US 2014/0023023 A1 Jan. 23, 2014

Related U.S. Application Data

(63) Continuation of application No. 12/957,353, filed on Nov. 30, 2010, now Pat. No. 8,570,984, which is a continuation of application No. 12/374,540, filed as application No. PCT/KR2007/005314 on Oct. 26, 2007, now Pat. No. 7,869,380.

(60) Provisional application No. 60/863,124, filed on Oct. 26, 2006.

(30) Foreign Application Priority Data

Oct. 31, 2006 (KR) .................. 10-2006-0106636
Nov. 16, 2006 (KR) .................. 10-2006-0113324

(51) Int. Cl.
*G01S 1/00* (2006.01)
*H04W 28/04* (2009.01)
(Continued)

(52) U.S. Cl.
CPC ......... *H04L 5/0053* (2013.01); *H04W 72/0406* (2013.01); *H04W 28/04* (2013.01);
(Continued)

(58) Field of Classification Search
CPC ............ H01Q 3/26; H04B 1/69; H04B 1/707; H04B 2201/70709; H04B 7/0682; H04W 24/00; H04W 28/04; H04W 52/028; H04W 72/02; H04W 84/18; H04W 92/02; H04W 74/08; H04W 74/0808; Y02B 60/50; H01S 1/00
USPC .......................... 370/254–350; 709/201–213
See application file for complete search history.

(56) References Cited

U.S. PATENT DOCUMENTS 7,724,712 B2    5/2010   Yoshida
7,724,765 B2    5/2010   Huang et al.
(Continued)

FOREIGN PATENT DOCUMENTS

CN    1462523    12/2003
CN    1830177     9/2006
(Continued)

OTHER PUBLICATIONS

IEEE Computer Society, et al.; "Part 11: Wireless LAN Medium Access Control (MAC) and Physical Layer (PHY) Specifications; Amendment 5: Spectrum and Transmit Power Management Extensions in the 5 GHz Band in Europe;" IEEE Standard for Information Technology—Telecommunications and Information Exchange Between Systems—Local and Metropolitan Area Networks—Specific Requirements; IEEE Std 802.11h-2003; pp. 46-51; XP002599969; Oct. 14, 2003.

(Continued)

*Primary Examiner* — Ayaz Sheikh
*Assistant Examiner* — Debebe Asefa
(74) *Attorney, Agent, or Firm* — Lee, Hong, Degerman, Kang & Waimey

(57) ABSTRACT

A method of channel assessment and channel searching in a wireless network is disclosed. The wireless network separately performs a channel assessment procedure and a channel searching procedure for channel change or another object. The channel assessment procedure is to measure a status or quality of a channel which is currently used in the wireless network. A coordinator of the wireless network designates a time interval to notify the channel assessment to other device of it. The channel assessment procedure may be performed periodically, and is preferably scheduled to allow other devices not to use the channel for the time interval which at least one device performs channel assessment.

14 Claims, 7 Drawing Sheets

(51) Int. Cl.
*H04W 74/08* (2009.01)
*H04L 5/00* (2006.01)
*H04W 72/04* (2009.01)
*H04W 48/08* (2009.01)
*H04W 72/08* (2009.01)

(52) U.S. Cl.
CPC .......... *H04W 74/08* (2013.01); *H04W 74/0808* (2013.01); *G01S 1/00* (2013.01); *H04W 48/08* (2013.01); *H04W 72/085* (2013.01)

(56) References Cited

U.S. PATENT DOCUMENTS

| | | | |
|---|---|---|---|
| 7,869,380 | B2 | 1/2011 | Jeon et al. |
| 8,498,237 | B2 * | 7/2013 | Corson et al. ................. 370/319 |
| 2004/0218568 | A1 | 11/2004 | Goodall et al. |
| 2004/0248618 | A1 | 12/2004 | Yoshii et al. |
| 2005/0088980 | A1 * | 4/2005 | Olkkonen et al. ............ 370/255 |
| 2005/0122999 | A1 | 6/2005 | Scherzer et al. |
| 2006/0029023 | A1 | 2/2006 | Cervello et al. |
| 2006/0094436 | A1 | 5/2006 | Kim et al. |
| 2006/0116080 | A1 | 6/2006 | Eom |
| 2006/0133543 | A1 | 6/2006 | Linsky et al. |
| 2007/0026808 | A1 | 2/2007 | Love et al. |
| 2007/0115796 | A1 | 5/2007 | Jeong et al. |
| 2007/0121705 | A1 | 5/2007 | French et al. |
| 2011/0069684 | A1 | 3/2011 | Jeon et al. |

FOREIGN PATENT DOCUMENTS

| | | |
|---|---|---|
| JP | 2005-341231 | 12/2005 |
| JP | 2006-191532 | 7/2006 |
| JP | 2006-197559 | 7/2006 |
| KR | 1020050040220 | 5/2005 |
| KR | 10-2004-0082661 | 6/2005 |
| KR | 20-0419292 | 6/2006 |
| WO | 2006/021937 | 3/2006 |
| WO | 2006/040669 | 4/2006 |
| WO | 2006/097832 | 9/2006 |

OTHER PUBLICATIONS

IEEE, "Part 15.3: Wireless Medium Access Control (MAC) and Physical Layer (PHY) Specifications for High Rate Wireless Personal Area Networks (WPANs)," IEEE Std 802.15.3, Sep. 2003, 324 pages.

IEEE, "Part 15.4: Wireless Medium Access Control (MAC) and Physical Layer (PHY) Specifications for Low-Rate Wireless Personal Area Networks (WPANs)," IEEE Std 802.15.4, Sep. 2006, 323 pages.

* cited by examiner

→ High-rate PHY(HRP)
--→ Low-rate PHY(LRP)

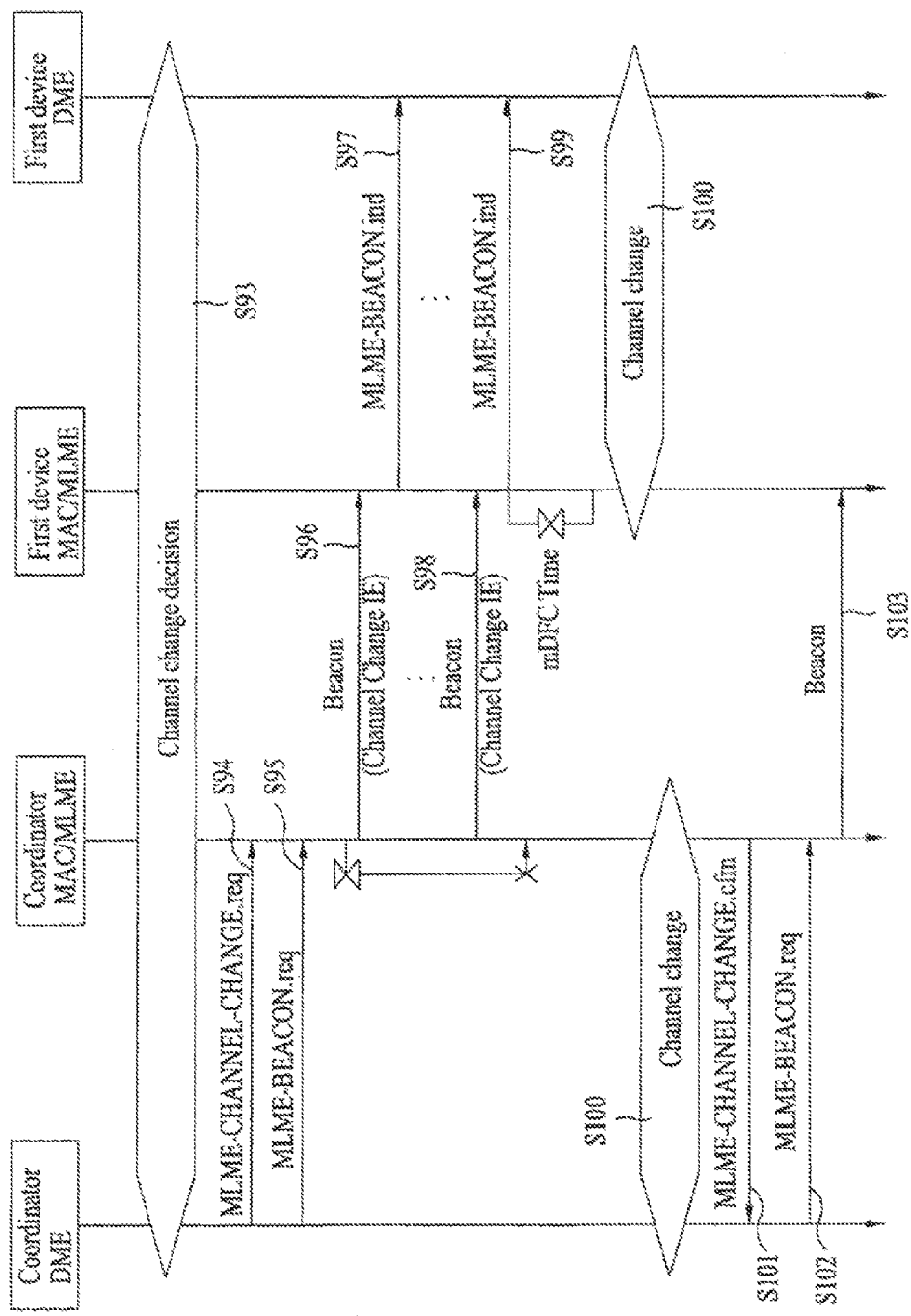

_US 9,001,773 B2_

METHOD OF CHANNEL ASSESSMENT AND CHANNEL SEARCHING IN A WIRELESS NETWORK

This application is a continuation of U.S. application Ser. No. 12/957,353, filed Nov. 30, 2010, now U.S. Pat No. 8,570,984, which is a continuation of U.S. application Ser. No. 12/374,540, filed Jan. 21, 2009, now U.S. Pat. No. 7,869,380, which is the National Stage filing under 35U.S.C. 371 of International Application No. PCT/KR2007/005314, filed on Oct. 26, 2007, which claims the benefit of earlier filing date and right of priority to Korean Application Nos. 10-2006-0113324, filed on Nov. 16, 2006, and 10-2006-0106636, filed on Oct. 31, 2006, and also claims the benefit of U.S. Provisional Application Ser. No. 60/863,124, filed on Oct. 26, 2006, the contents of which are all hereby incorporated by reference herein in their entirety.

TECHNICAL FIELD

The present invention relates to a wireless network, and more particularly, to a method of channel assessment and channel searching in a wireless network.

BACKGROUND ART

Recently, Bluetooth, wireless personal area network (WPAN) technology has been developed, which allows audio or video data to be exchanged between devices by configuring a wireless network between a relatively small number of digital devices in limited places such as homes or small-scaled companies. WPAN can be used to exchange information between a relatively small number of digital devices in a relatively close distance, and enables communication of low power and low cost between digital devices.

FIG. 1 illustrates a configuration example of WPAN. As shown in FIG. 1, the WPAN is a network configured between devices within a limited place such as home. The network is configured by direct communication between devices to enable seamless exchange of information between applications. Referring to FIG. 1, the WPAN is comprised of at least two user devices 11 to 15, wherein one of the user devices is operated as a coordinator 11. The coordinator 11 serves to provide basic timing of the WPAN and control quality of service (QoS) requirements. Examples of the user devices include computer, PDA, notebook computer, digital TV, camcorder, digital camera, printer, mike, speaker, headset, barcode reader, display, and cellular phones. All digital devices can be used as the user devices.

The WPAN is an ad hoc network (hereinafter, referred to as 'piconet') which is not previously designed but formed if necessary without assistance of a central infra. The procedure of forming one piconet will be described as follows. The piconet starts in such a manner that a random device that can be operated as a coordinator performs a function of a coordinator. All devices start a new piconet or perform scanning before association with the existing piconet. Scanning means that a device collects and stores information of channels and searches the presence of the existing piconet. A device which has been instructed from an upper layer to start a piconet forms a new piconet without association with a piconet which is previously formed on a random channel. The device starts a piconet by selecting a channel having little interference based on the data acquired during scanning and broadcasting a beacon through the selected channel. In this case, the beacon is timing allocation information, information of other devices within the piconet, and control information broadcasted by a coordinator to control and manage the piconet.

Since the state of the channel used in the wireless network is variable temporally, even though desirable communication between devices can be performed owing to good state of the channel when the wireless network is formed, a problem in performing communication between devices may occur as the channel state becomes poor in accordance with the lapse of the time. Accordingly, it la necessary to continuously assess and search a state of a channel which is being currently used in the wireless network and states of other channels in addition to the current channel. As a result, if these is another channel that can be used by the wireless network and has a better state than that of the current channel, the current channel can be changed to the better channel to continue to enable desirable communication.

DISCLOSURE OF THE INVENTION

Accordingly, the present invention is directed to a method of channel assessment and channel searching in a wireless network, which substantially obviates one or more problems due to limitations and disadvantages of the related art.

An object of the present invention is to provide a method of channel assessment and channel searching in a wireless network, in which desirable communication can be performed in the wireless network.

Another object of the present invention is to provide a method of channel assessment and channel searching in a wireless network, in which a procedure tor channel change in the wireless network can be simplified.

To achieve these objects and other advantages and in accordance with the purpose of the invention, as embodied and broadly described herein, a wireless network separately performs a channel assessment procedure and a channel searching procedure for channel change or another object. The channel assessment procedure is to measure a status or quality of a channel which is currently used in the wireless network. A coordinator of the wireless network designates a time interval for the channel assessment to notify other device of it. The channel assessment procedure may be performed periodically, and is preferably scheduled to allow other devices not to use the channel for the time interval which at least one device performs channel assessment. The channel searching procedure is to a status or quality of an available channel other than the channel which is currently used in the wireless network. The coordinator of the wireless network can request other device through a beacon to request channel assessment and channel searching, thereby more simplifying the procedure than respectively requesting the channel assessment and the channel searching for each device.

In one aspect of the present invention, a method of channel assessment in a coordinator of a wireless network includes broadcasting a first information element for requesting assessment of a channel which is currently used in the wireless network, receiving an acknowledgement response to the request of the channel assessment from at least one device of the wireless network, transmitting time interval information for performing the channel assessment to the at least one device, and receiving a result of the channel assessment acquired for a time interval indicated by the time interval information from the at least one device.

In another aspect of the present invention, a method of searching a channel other than a current channel which is currently used in a wireless network includes broadcasting a first information element for requesting searching of at least one channel other than the channel which is currently used in the wireless network, receiving an acknowledgement response to the request of the channel searching from at least one device of the wireless network, and receiving a result of the channel searching, which displays a status of the at least one channel measured by the at least one device, from the at least one device.

In still another aspect of the present invention, a method of channel assessment in a specific device of a wireless network includes receiving a beacon which includes a first information element for requesting assessment of a channel which is currently used, from a coordinator of the wireless network, transmitting an acknowledgement response to the request of the channel assessment to the coordinator, receiving a beacon, which includes time interval information to perform the channel assessment, from the coordinator, measuring a status of the current channel for a time interval indicated by the time interval information, and transmitting a result of channel assessment acquired by measuring the status of the channel.

In further still another aspect of the present inventions a method of searching a channel other than a current channel which is currently used in a wireless network includes receiving a beacon which includes a first information element for requesting searching of at least one channel other than the channel which is currently used, from a coordinator of the wireless network, receiving an acknowledgement response to the request of the channel searching to the coordinator, measuring a status of the at least one channel, and transmitting a result of channel searching, which displays a status of the at least one channel in accordance with the measured result, to the coordinator.

BRIEF DESCRIPTION OF THE DRAWINGS

FIG. 6A to FIG. 6C are flow charts illustrating procedures according to the preferred embodiments of the present invention, each of which illustrates a channel assessment procedure, a channel searching procedure, and a channel change procedure.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described hereinafter are examples in which technical features of the present invention are applied to a wireless video area network (WVAN) which is a kind of WPAN.

Figure 1:
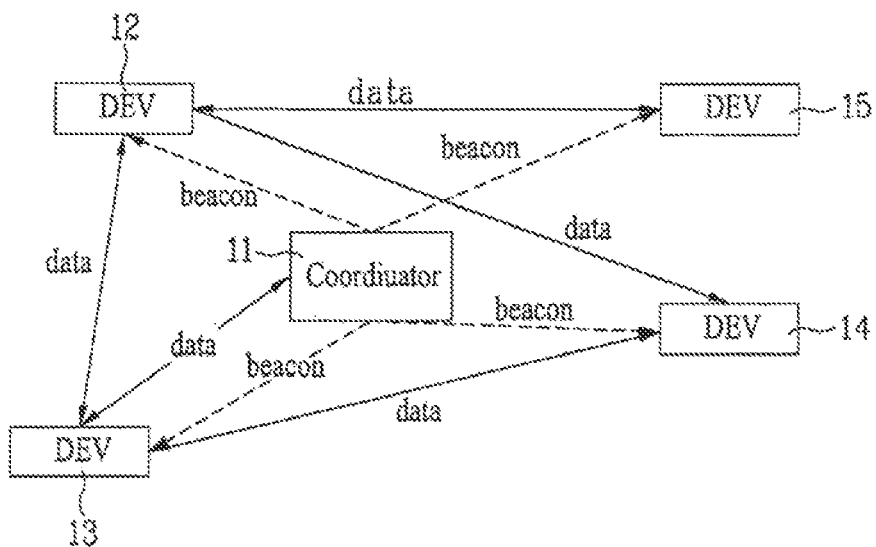
FIG. 1 is a diagram illustrating a configuration example of WPAN.
Figure 2:
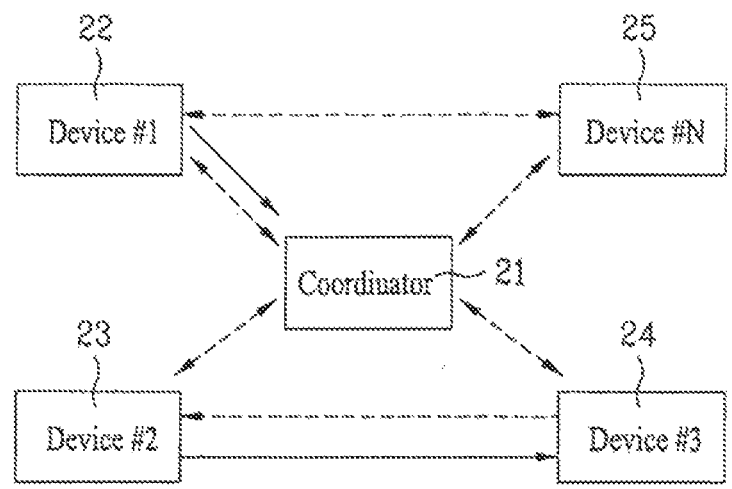
FIG. 2 is a diagram illustrating a configuration example of WPAN.

FIG. 2 illustrates a configuration example of WVAN. Like WPAN shown in FIG. 1, the WVAN includes at least two user devices 21 to 25, wherein one of the user devices is operated as a coordinator 21. The coordinator 21 serves to provide basic timing of the WVAN and control quality of service (QoS) requirements. Unlike the WPAN of FIG. 1, the WVAN shown in FIG. 2 supports two kinds of physical (PHY) layers. In other words, the WVAN supports physical layers, i.e., a high-rate physical (HRP) layer and a low-rate physical (LRP) layer. The HRP layer is a physical layer which supports a data transmission speed of 1 Gb/s or greater while the LRP layer is a physical layer which supports a data transmission speed of several Mb/s. The HRP layer is highly directional, and is used to transmit isochronous data streams, asynchronous data, MAC command, and A/V control data through unicast connection. The LRP layer supports a directional or omni-directional mode, and is used to transmit a beacon, asynchronous data, and MAC command through unicast or broadcast.

Figure 3:
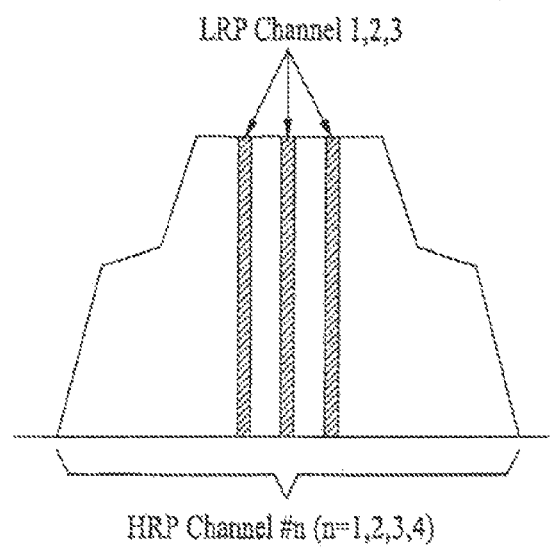
FIG. 3 is a diagram illustrating a frequency band of HRP channels and LRP channels used in WVAN.

FIG. 3 illustrates a frequency band of HRP channels and LRP channels used in the WVAN. The HRP layer uses four channels of a bandwidth of 2.0 GHz in a band of 57-66 GHz, and the LRP uses three channels of a bandwidth of 92 MHz. As shown in FIG. 3, the HRP channels and the LRP channels commonly use a frequency band and are used respectively by a TDMA mode.

Figure 4:
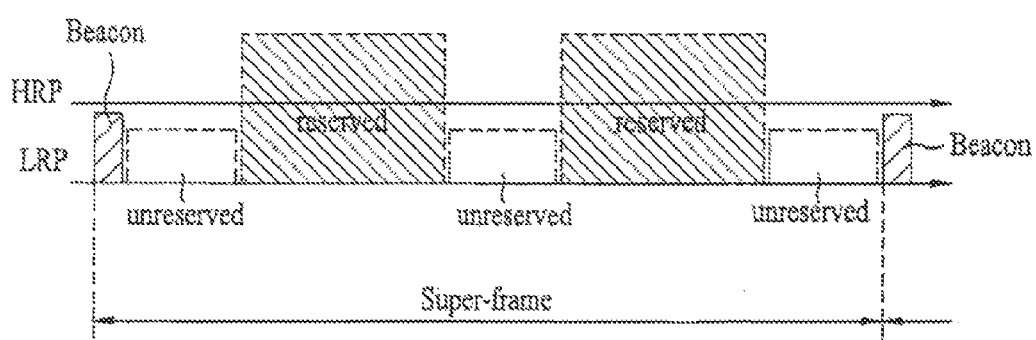
FIG. 4 is a diagram illustrating an example of a structure of superframes used in WVAN.

FIG. 4 illustrates an example of a structure of superframes used in the WVAN. Referring to FIG. 4, each superframe includes a beacon region to which a beacon is transmitted, a reserved region allocated to a random device by the coordinator in accordance with a request of devices, and an unreserved region where data are transmitted and received between the coordinator and a device or between devices in accordance with a contention based mode without being allocated by the coordinator, wherein each of the regions undergoes time division. The beacon includes timing allocation information in a corresponding superframe and management and control information of WVAN. The reserved region is used to allow a device, to which a channel time is allocated by the coordinator in accordance with a channel time allocation request of the device, to transmit data to another device. Commands, data streams, asynchronous data, etc. can be transmitted through the reserved region. If a specific device transmits data to another device through the reserved region, the HRP channels are used. If a device which receives data transmits an acknowledgement or negative acknowledgement (ACK/NACK) signal in response to the received data, the LRP channels are used. The unreserved region can be used to transmit control information, MAC command or asynchronous data between the coordinator and the device or between the devices. To avoid data collision between the devices in the unreserved region, a carrier sense multiple access (CSMA) mode or a slotted Aloha mode can be used. In the unreserved region, data can be transmitted through the LRP channels only. If there are provided a lot of commands or control information to be transmitted, a reserved region may be set in the LRP channels. The length and the number of reserved regions and unreserved regions in each superframe may depend on superframe and may be controlled by the coordinator.

Figure 5:
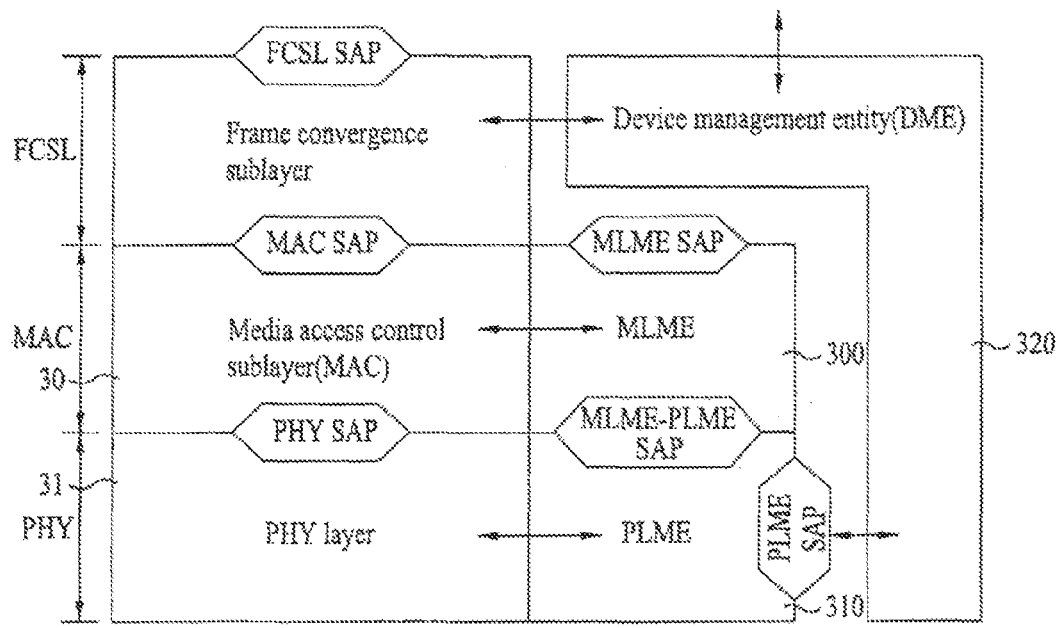
FIG. 5 is a diagram illustrating an example of a structure of a protocol layer implemented in a device of WVAN.

FIG. 5 illustrates a structure of a protocol layer implemented in a device of WVAN. Referring to FIG. 5, a communication module of each device included in the WVAN can be divided into at least two layers depending on its function. In general, the communication module includes a PHY layer 31 and a MAC layer 30. The communication module includes entities which manage each layer, wherein a MAC layer management entity (MLME) 300 manages the MAC layer and a PHY layer management entity (PLME) 310 manages the PHY layer. Also, the communication module further includes a device management entity (DME) 320 which collects state information of each device and serves as a control interface between a host and a radio device.

Figure 6A:
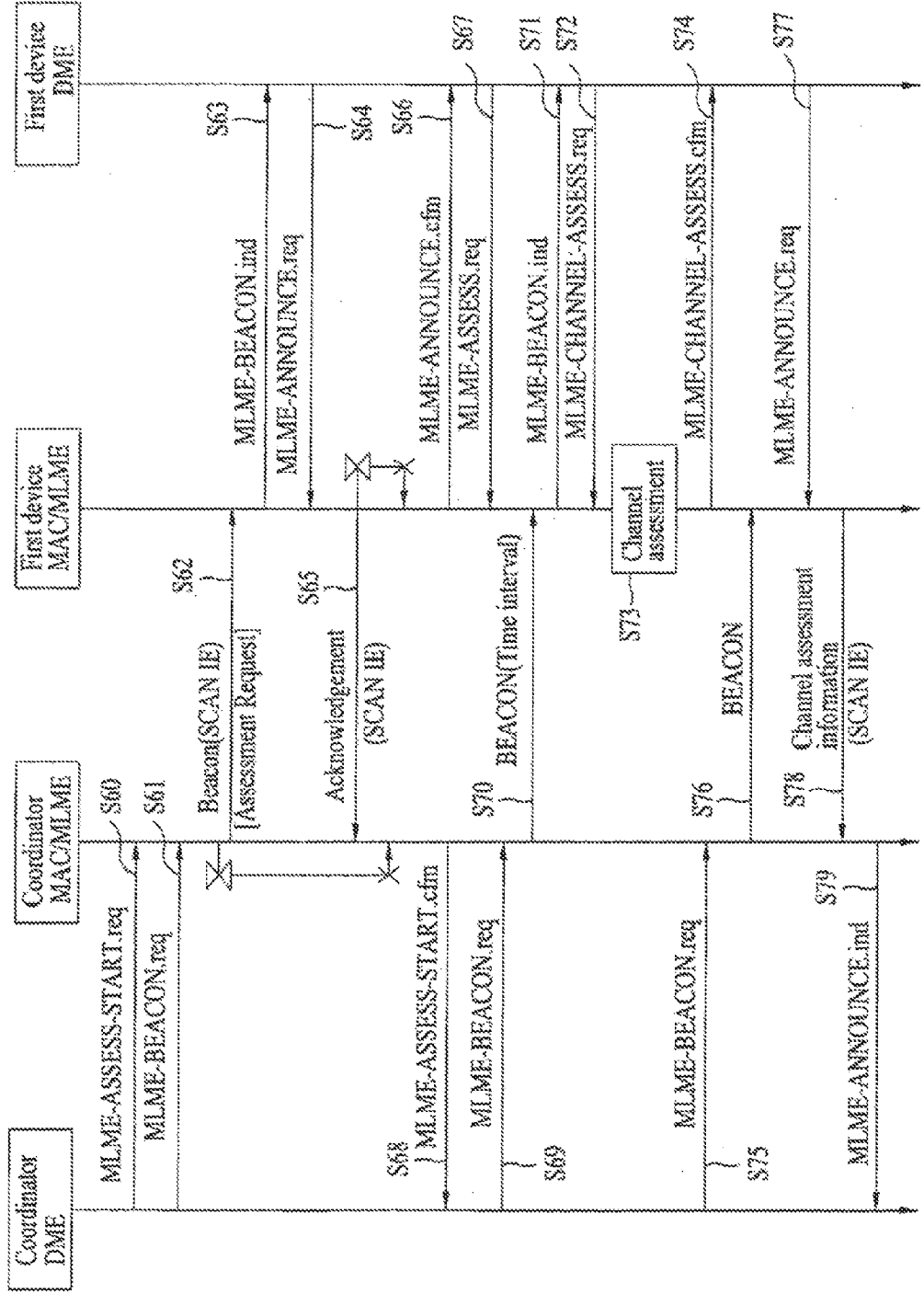
Figure 6B:
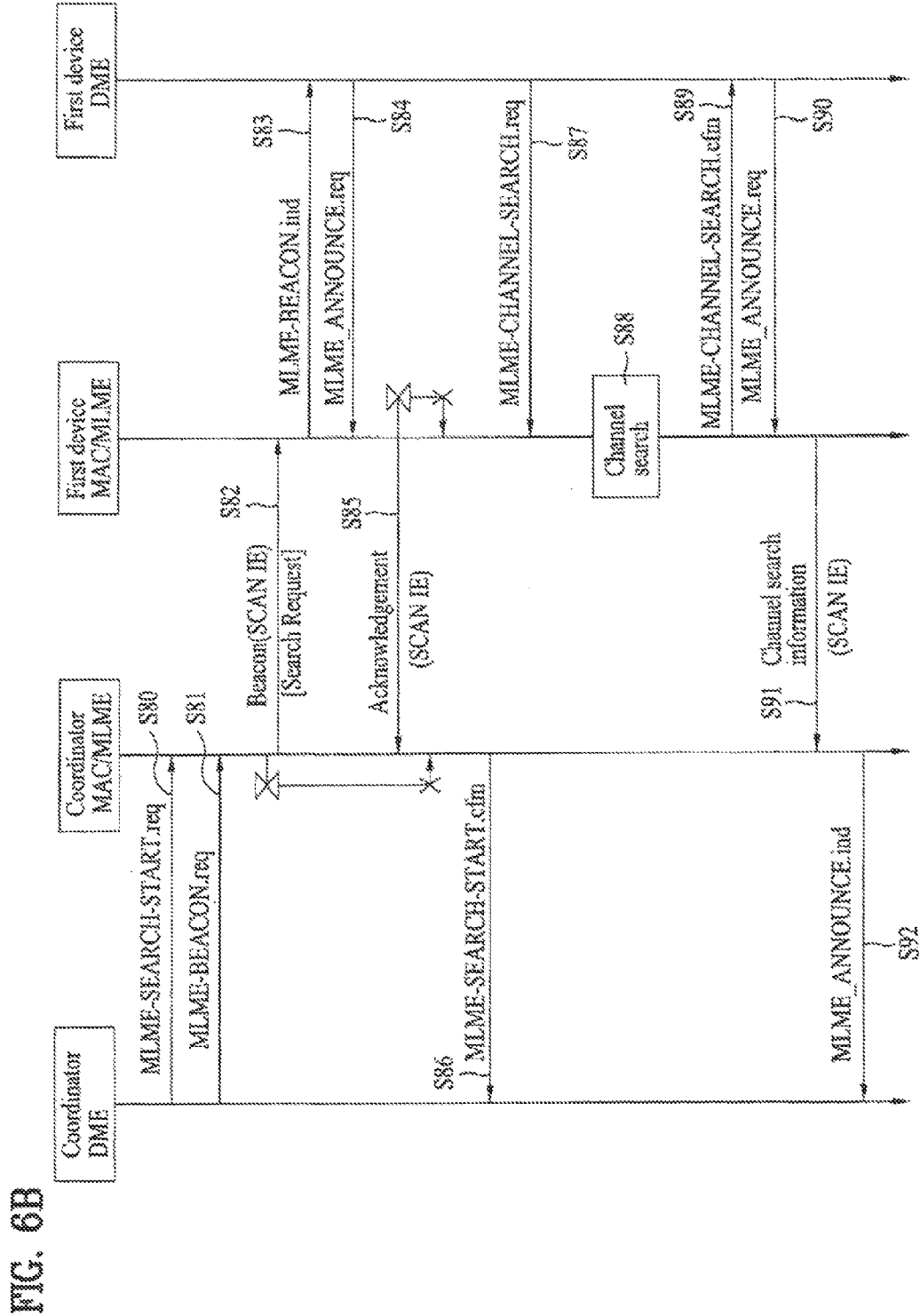

FIG. 6A to FIG. 6C are flow charts illustrating procedures according to the preferred embodiments of the present invention, each of which illustrates a channel assessment procedure, a channel searching procedure, and a channel change procedure. In the embodiments of FIG. 6A to FIG. 6C, it is supposed that a coordinator, a first device and other devices constitute a single WVAN through specific HRP and LRP channels. However, for convenience of description, other devices except the first device are not shown.

Referring to FIG. 6A, a DME of the coordinator forwards MLME-ASSESS-START.req primitive to MAC/MLME of the coordinator to request devices of the wireless network to execute a channel assessment work [S60], and forwards MLME-BEACON.req primitive to the MAC/MLME of the coordinator to command the devices to broadcast a beacon [S61]. The MAC/MLME of the coordinator requests the devices of the wireless network to execute channel assessment, through the beacon [S62]. In other words, the MAC/MLME of the coordinator includes 'SCAN IE,' which is an information element (IE) for requesting channel assessment, to broadcast the beacon to the devices of the wireless network. Since the beacon is broadcasted to all the devices on the network through the coordinator in the WVAN, it is possible to request all the devices within the network to execute channel assessment by transmitting the beacon which includes SCAN IE which is an information element for requesting channel assessment.

Table 1 illustrates a format of a beacon frame according to the preferred embodiment of the present invention. The beacon is a message which is periodically transmitted to illustrate start of all super frames, and includes a 'Beacon Control' field, a 'CBCP end time' field, and a plurality conformation element (IE) fields.

TABLE 1

| 1(byte) | 1 | variable | ... | variable | ... | variable | ... | 4 |
|---|---|---|---|---|---|---|---|---|
| Beacon Control | CBCP end time | IE 1 | ... | SCAN IE | ... | IE n | ... | CRC |

The 'Beacon Control' field includes beacon control information, and the 'CBCP end time' field includes information of CBCP end time. Information elements included in the beacon can include information of a reserved channel interval of a superframe, information of an interval length of a superframe, and information of parameters according to transmission antenna power that can be supported by a current network. The coordinator may select the information elements and include them in the beacon as the case may be. In Table 1, "SCAN IE" field includes an information element additionally provided in accordance with one embodiment of the present invention. Table 2 illustrates an example of a format of the 'SCAN IE' field.

TABLE 2

| 1(octet) | 1 | 6 | 1 | 1 |
|---|---|---|---|---|
| IE Index | IE length = 8 | MAC address | Index | Channel Status |

In Table 2, 'Index' field includes information for identifying a use of the 'SCAN IE' field. For example, the 'Index' field may include '00000000' in case of 'SCAN IE' for requesting channel assessment, and include '01000000' in case of 'SCAN IE' for requesting channel searching.

Table 3 illustrates another example of the format of the 'SCAN IE' filed.

TABLE 3

| 1(octet) | 1 | 1 | 2 | 4 |
|---|---|---|---|---|
| IE index | IE length = 7 | DevID | Control bitmap | Channel status data |

In Table 3, a 'DevID' field includes device identifier information, a 'Control bitmap' field allows the 'SCAN IE' to be used in various uses, and a 'Channel status data' field includes information which indicates a result of channel assessment or channel searching. The 'Channel status data' field does not include any information when the 'SCAN IE' is used to request channel assessment or channel searching.

Table 4 illustrates an example of a data format of the 'Control bitmap' field.

TABLE 4

| Bits: 4 | 2 | 2 | 4 | 4 |
|---|---|---|---|---|
| Request type (0-15) | HRP channel index (0-3) | LRP channel index (0-2) | Channel Status Data type (0-15) | Reserved |

In Table 4, a 'Request type' field is to designate a use of the 'SCAN IE' field. A 'HRP channel index' field and a 'LRP channel index' field are index fields of HRP and LRP channels targeted for channel assessment or channel searching in accordance with the 'Request type' field. A 'Channel status data type' field is to indicate a data type of the 'Channel status data' field of Table 3.

Table 5 illustrates a detailed example of the 'Request type.'

TABLE 5

| Request type | Description |
|---|---|
| 0 | Current channel assessment request |
| 1 | Current channel assessment response |
| 2 | New channel searching request |
| 3 | New channel searching response |
| 4-15 | Reserved |

In Table 5, if the 'Request type' field is set to '0.' it means that the 'SCAN IE' is used for a request of channel assessment. Also, if the 'Request type' field is set to '1,' it means that the 'SCAN IE' is used for a response of channel assessment. Moreover, if the 'Request type' field is set to '2,' it means that the 'SCAN IE' is used for a request of channel searching. If the 'Request type' field is set to '3,' it means that the 'SCAN IE' is used for a response of channel searching.

Table 6 illustrates an example of a data format of the 'Channel status data type' field in Table 5.

TABLE 6

| Data type | Description |
|---|---|
| 0 | Channel assessment index (0: good, 1: bad) |
| 1-15 | Reserved |

In Table 6, if the 'Channel status data type' field is set to '0,' it means that a channel status included in the 'Channel status data' field is displayed in two levels of 'good' or 'bad' in accordance with the result of channel assessment or channel searching. The channel status can be displayed in three levels or more. At this time, whether the channel status according to the result of channel assessment or channel searching belongs to which level in each device can be set by various standards, and the set standard can be modified by a designer's intention.

The MAC/MLME of the first device which received the beacon which includes the SCAN IE forwards MLME_BEACON.ind primitive to the DME of the first device to notify that the beacon which includes a request tor channel assessment has been received from the coordinator [S63]. The DME of the first device transmits MLME-ANNOUNCE.req primitive to the MAC/MLME of the first device in response to the MLME_BEACON.ind to command the MAC/MLME of the first device to transmit whether to perform a channel assessment work to the coordinator [S64]. The MAC/MLME of the first device transmits an acknowledgement response to the request for channel assessment of the coordinator to notify whether to perform the channel assessment work [S65]. In other words, the first device can transmit a specific message which includes the 'SCAN IE' to the coordinator to notify whether to perform channel assessment. Since all of devices within the wireless network cannot perform channel assessment, it is preferable that each device notifies the coordinator whether each device can perform the channel assessment work.

The MAC/MLME of the coordinator forwards MLME-ASSESS-START.cfm primitive to the DME of the coordinator to notify that an acknowledgement response to the request for channel assessment has been received from the first device [S68]. The MAC/MLME of the first device forwards MLME-ANNOUNCE.cfm primitive to the DME of the first device to notify that an acknowledgement response has been transmitted to the coordinator [S66]. The DME of the first device transmits MLME-ASSESS.req primitive to the MAC/MLME of the first device in response to the MLME-ANNOUNCE.cfm primitive [S67].

The DME of the coordinator forwards MLME_BEACON.req primitive to the MAC/MLME of the coordinator to request the MAC/MLME of the coordinator to transmit the beacon [S69]. The MAC/MLME of the coordinator allocates a time interval for performing channel assessment, i.e., a channel time block (CTB), and broadcasts a beacon which includes information of the time interval to the devices of the wireless network [S70]. Preferably, the coordinator is scheduled so as not to allow other devices to perform data transmission for the CTB for performing the channel assessment. In other words, it is preferable that the wireless network can exactly measure status or quality of a current channel by performing channel assessment in a state that data are not transmitted on the wireless network for the time interval.

The MAC/MLME of the first device forwards MLME-BEACON.ind primitive to the DME of the first device [S71]. The DME of the first device forwards MLME-CHANNEL-ASSESS.req primitive to the MAC/MLME to command the MAC/MLME to perform channel assessment [S72]. The MAC/MLME of the first device forwards MLME-CHANNEL-ASSESS.cfm primitive to the DME of the first device in response to the MLME-CHANNEL-ASSESS.req primitive [S74]. Other devices which have reported to the first device and the coordinator with respect to execution of channel assessment perform channel assessment for the time interval [S73]. Channel assessment can be performed by measuring energy level, noise level, or interference level on the channel for the time interval. Since the wireless network uses HRP channel and LRP channel, it performs channel assessment for at least one of the two channels. Parameters which can assess the channel status are not limited to energy, noise, and interference level on the channel. For example, a bit error rate (BER) or a frame error rate (FER) measured by the devices of the wireless network during data reception may be used as a parameter that can assess the channel status. As described above, the measured channel status can be assessed by two levels or greater.

The DME of the coordinator forwards MLME-BEACON.req primitive to the MAC/MLME of the coordinator to command the MAC/MLME to broadcast the beacon [S75]. The MAC/MLME of the coordinator broadcasts the beacon in accordance with the command [S76]. The DME of the first device forwards MLME_ASSESS.req primitive to the MAC/MLME of the first device to notify that the channel assessment work has been performed [S77]. The MAC/MLME of the first device transmits channel assessment information which includes the channel assessment result to the coordinator [S78], and the MAC/MLME of the coordinator forwards MLME-ANNOUNCE.ind primitive to the DME of the coordinator to notify that the channel assessment information has been received [S73]. If the coordinator has received channel assessment information from two or more devices within the wireless network, it is possible to assess the status of the channel considering all the factors of the received channel assessment information.

Referring to FIG. 6B, the DME of the coordinator transmits MLME-SEARCH-START.req primitive to the MAC/MLME of the coordinator to request the devices of the wireless network to perform a channel searching work [S80], and forwards MLME-BEACON.req primitive to command the devices of the wireless network to broadcast the beacon [S81]. The MAC/MLME of the coordinator requests the devices of the wireless network through the beacon to perform channel searching [S82]. In other words, the MAC/MLME of the coordinator broadcasts the beacon to the devices of the wireless network, wherein the beacon includes 'SCAN IE' which requests channel searching. The MAC/MLME of the first device which has received the beacon which includes the SCAN IE forwards MLME-BEACON.ind primitive to the DME of the first device to notify that the channel searching request has been received from the coordinator [S8]. The DME of the first device transmits MLME_ANNOUNCE.req primitive to the MAC/MLME of the first device in response to the MLME-BEACON.ind primitive to command the MAC/MLME to transmit whether to perform a channel searching work to the coordinator [S84]. The MAC/MLME of the first device transmits acknowledgement response to the channel searching request of the coordinator to notify whether to perform the channel searching work [S85]. The acknowledgement response may be transmitted through 'SCAN IE.' The MAC/MLME of the coordinator forwards MLME-SEARCH-START.cfm primitive to the DME of the coordinator to notify that the acknowledgement response to the channel searching request has been received from the first device [S86]. The DME of the first device transmits MLME-CHANNEL-SEARCH.req primitive to the MAC/MLME of the first device to command channel searching [S87]. If the acknowledgement response to the channel searching request is received from the first device, it is preferable that the coordinator notifies other devices through the beacon that the first device is performing channel searching.

The MAC/MLME of the first device performs channel searching [S88]. The channel searching can be performed in such a manner that the first device changes a current channel used in the wireless network to another channel and measures energy level, noise level or interference level on the changed channel.

As shown in FIG. 3, communication is performed by two channels, i.e., HRP channel and LRP channel in the WVAN. Four channels of a bandwidth of 2.0 GHz can be used as the HRP channels in 57-66 GHz bands. Three channels of a bandwidth of 92 MHz for each of the HRP channels can be used as the LRP channels. Of them, since one HRP channel and one LRP channel are currently used by the wireless network, three HRP channels and three LRP channels for the respective HRP channels are targeted for channel searching. Channel searching can be performed for three HRP channels and three LRP channels for the respective HRP channels. For another example, channel searching may first be performed for LRP channels, and LRP channels having good channel status may be selected to perform channel searching for HRP channels corresponding to the selected LRP channels. By contrast, channel searching may first be performed for HRP channels, and channel searching may be performed for three LRP channels corresponding to the selected HRP channels. Channel searching for the respective channels may be performed, but not limited, in such a manner that energy, noise or interference level is measured on the channels like channel assessment in FIG. 5A.

The MAC/MLME of the first device forwards MLME-CHANNEL-SEARCH.cfm primitive to the DME of the first device to notify that channel searching has been performed [S89]. The DME of the first device forwards MLME-ANNOUNCE.req primitive to the MAC/MLME of the first device to command the coordinator to report the channel searching result [S90]. The MAC/MLME of the first device transmits channel searching information including the channel searching result to the coordinator [S91]. The channel searching information may be transmitted through 'SCAN IE' as shown in Table 3. The MAC/MLME of the coordinator forwards MLME-ANNOUNCE.ind primitive to the DME of the coordinator to notify that the channel searching information has been received [S92]. Preferably, the coordinator which has received the channel searching information from the first device notifies other devices of the wireless network through the beacon that the channel searching procedure has ended.

Referring to FIG. 6C, the coordinator determines channel change and a channel to be used after channel change in accordance with the channel assessment and the channel searching result [S93]. In other words, the coordinator determines whether to perform channel change from a current channel to another channel based on the channel assessment information received from the first device and/or other devices. If the coordinator has determined channel change, it selects a channel to be used after channel change based on channel searching information received from the first device and/or other devices as a result of the channel searching. For another example, the channel assessment work is performed periodically or if the coordinator or any one of the devices wishes to perform the channel assessment work. The coordinator or any one of the devices determines whether to perform channel change in accordance with the result of the channel assessment work. If the coordinator or any one of the devices has determined channel change, it may perform channel change by performing a channel searching procedure and determining a channel to be used after channel change in accordance with the result of the channel searching procedure.

The DME of the coordinator forwards MLME-CHANNEL-CHANGE.req primitive to the MAC/MLME of the coordinator to request channel change [S94], and also forwards MLME-BEACON.req primitive to command the MAC/MLME to broadcast the beacon [S95]. The MAC/MLME of the coordinator broadcasts the beacon, which includes an information element 'CHANNEL CHANGE IE' for requesting channel change, to all the devices of the wireless network [S96]. The CHANNEL CHANGE IE includes index of a channel after change and information relating to the number of transmission times of the beacon on the channel before change.

Table 7 illustrates an example of a data format of 'CHANNEL CHANGE IE.'

TABLE 7

| 1(octets) | 1 | 1 | 1 |
|---|---|---|---|
| IE Index | IE length = 2 | Channel Index | Number of Beacons to Change |

In Table 7, a 'Channel Index' field includes information indicating index of a channel after change, and a 'Number of Beacons to Change' field represents the number of transmission times of the beacon on the channel before change. Table 8 is an example of channel index included in the 'Channel Index' field.

TABLE 8

| Channel Index | Description |
|---|---|
| 00000100 | HRP CH#1 |
| 00000101 | HRP CH#1 LRP CH#1 |
| 00000110 | HRP CH#1 LRP CH#2 |
| 00000111 | HRP CH#1 LRP CH#3 |
| 00001000 | HRP CH#2 |
| 00001001 | HRP CH#2 LRP CH#1 |
| 00001010 | HRP CH#2 LRP CH#2 |
| 00001011 | HRP CH#2 LRP CH#3 |
| 00001100 | HRP CH#3 |
| 00001101 | HRP CH#3 LRP CH#1 |
| 00001110 | HRP CH#3 LRP CH#2 |
| 00001111 | HRP CH#3 LRP CH#3 |
| 00010000 | HRP CH#4 |
| 00010001 | HRP CH#4 LRP CH#1 |
| 00010010 | HRP CH#4 LRP CH#2 |
| 00010011 | HRP CH#4 LRP CH#3 |

The beacon which includes the CHANNEL CHANGE IE is broadcasted as much as the number of times previously determined on the channel before change [S98]. The MAC/MLME of the first device forwards MLME-BEACOn.ind primitive to the DME of the first device to notify that the beacon indicating channel change has been received [S97, S99]. After the coordinator broadcasts the beacon which includes the CHANNEL CHANGE IE as much as the number of times previously determined, the coordinator and devices of the wireless network change the current channel to a channel after change [S100]. At this time, the first device can change the channel after the lapse of a certain time (mDFC Time) after receiving the last beacon. The MAC/MLME of the coordinator forwards MLME-CHANNEL-CHANGE.cfm primitive to the DME of the coordinator to notify that the channel has been changed [S101]. The DME of the coordinator forwards MLME-BECAON.req primitive to the MAC/MLME to command the MAC/MLME to broadcast the beacon on a new channel [S102]. The MAC/MLME of the coordinator broadcasts the new beacon on the changed channel to allow other devices to perform communication on the changed channel [S103]. The coordinator and devices perform communication on the changed HRP channel and LRP channel under the control of the coordinator.

Table 9 illustrates an example of a data format of 'Frequency Change IE' which is another example of an information element (IE) broadcasted by being included in the beacon to command channel change.

TABLE 9

| Octets: 1 | 1 | 1 |
|---|---|---|
| IE index | IE length = 1 | DFC bitmap |

In Table 9, a 'DFC bitmap' field includes channel information to be used after change and information relating to the number of beacons to be transmitted before channel change. Table 10 illustrates an example of a data format of the 'DFC bitmap' field.

TABLE 10

| Bits: 2 | 2 | 4 |
|---|---|---|
| HRP channel | LRP channel | DFC Countdown |

In Table 10, a 'HRP channel' field includes identification information of HRP channel to be used after channel change, a 'LRP channel' field includes identification information of LRP channel to be used after channel change, and a 'DFC Countdown' field indicates the number of beacons to be broadcasted until the channel is changed.

Figure 7:
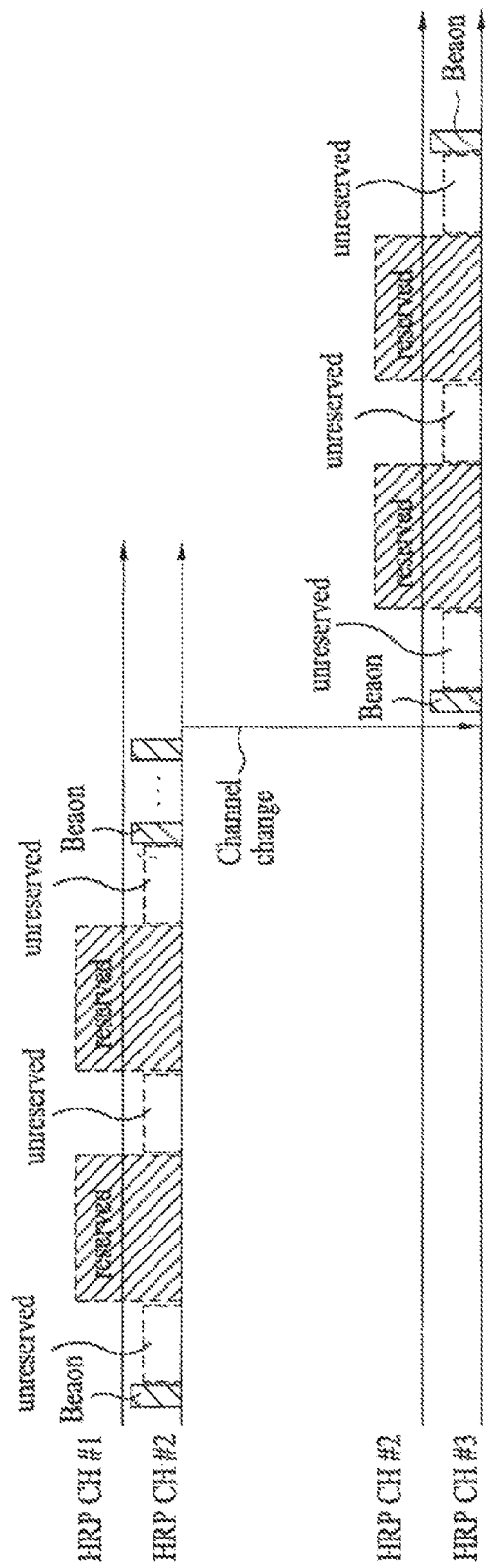
FIG. 7 is a diagram illustrating an example of an operation procedure of a device after channel change in WVAN in accordance with the preferred embodiment of the present invention.

FIG. 7 illustrates an example of an operation procedure of a device after channel change in the WVAN in accordance with the preferred embodiment of the present invention. Referring to FIG. 7, it is noted that the wireless network is operated on HRP CH#1 and LRP CH#2 before channel change and then operated on HRP CH#2 and LRP CH#3 in accordance with channel change. In FIG. 7, a reserved region, an unreserved region, HRP channel and LRP channel can refer to the part described with reference to FIG. 4.

Terminologies used herein may be replaced with other terminologies. For example, the device may be replaced with a user device (or apparatus) or station, the coordinator may be replaced with a coordinating apparatus (or control apparatus), a coordinating device (or control device), a coordinating station (or control station), or piconet coordinator (PNC).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, it may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, desirable communication can be performed even though the status of the current channel becomes poor. Also, the procedure for channel assessment, channel searching and channel change can be simplified.

If will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention is applicable to a wireless network system.

What is claimed is:

1. A method of controlling a channel searching by a coordinator in a wireless network, the method performed by the coordinator and comprising:
    broadcasting a first beacon which includes a first information element to request a device to perform a channel searching for at least one channel other than a channel that is currently used in the wireless network, the channel comprising a high rate physical channel and a low rate physical channel;
    receiving an acknowledgement response from the device, the acknowledgement response indicating that the device will perform the channel searching;
    broadcasting a second beacon to inform devices in the wireless network that the device is performing the channel searching; and
    receiving a second information element comprising a result of the channel searching from the device, the result of the channel searching comprising a status of the at least one channel searched by the device.

2. The method of claim 1, further comprising broadcasting a third beacon to inform the devices in the wireless network that the device has returned to the channel that is currently used in the wireless network after receiving the second information element.

3. The method of claim 1, wherein the result of the channel searching is represented by channel status types.

4. The method of claim 1, wherein the second information element further comprises identification of the high rate and low rate physical channels, and a data type field indicating an index type.

5. The method of claim 1, wherein the second information element further comprises a data type field indicating an index type.

6. The method of claim 1, further comprising:
    determining whether to change the channel that is currently used in the wireless network to another channel based on the result of the channel searching; and
    broadcasting a fourth beacon which comprises a field indicating a number of times of beacons to be broadcast by the coordinator before changing the channel.

7. A method of searching a channel by a device in a wireless network, the method comprising:

Receiving a first beacon broadcast by a coordinator, the first beacon including a first information element to request the device to perform a channel searching for at least one channel other than a channel that is currently used in the wireless network, the channel comprising a high rate physical channel and a low rate physical channel;

transmitting an acknowledgement response to the coordinator, the acknowledgement response indicating that the device will perform the channel searching;

receiving a second beacon including information which informs devices in the wireless network that the device is performing the channel searching;

performing the channel searching by estimating a quality of the at least one channel other than the channel that is currently used in the wireless network; and transmitting a second information element to the coordinator, the second information comprising a result of the channel searching, the result of the channel searching comprising a status of the at least one channel searched by the device.

8. The method of claim 7, further comprising receiving a third beacon informing the devices in the wireless network that the device has returned to the channel that is currently used in the wireless network after transmitting the second information element.

9. The method of claim 7, wherein the result of the channel searching is represented by channel status types.

10. The method of claim 7, wherein the second information element further comprises identification of the high rate and low rate physical channels, and a data type field indicating an index type.

11. The method of claim 7, wherein the second information element further comprises a data type field indicating an index type.

12. The method of claim 7, further comprising:

receiving a fourth beacon from the coordinator, the fourth beacon comprising a field indicating a number of beacons to be broadcast by the coordinator before changing the channel; and changing the channel that is currently used in the wireless network to another channel after receiving beacons the number of times indicated by the fourth beacon.

13. A coordinator in a wireless network configured to:

broadcast a first beacon which includes a first information element to request a device to perform a channel searching for at least one channel other than a channel that is currently used in the wireless network, the channel comprising a high rate physical channel and a low rate physical channel;

receive an acknowledgement response from the device, the acknowledgement response indicating that the device will perform the channel searching;

broadcast a second beacon to inform devices in the wireless network that the device is performing the channel searching; and receive a second information element comprising a result of the channel searching from the device, the result of the channel searching comprising a status of the at least one channel searched by the device.

14. A device for searching a channel in a wireless network, the device configured to:

receive a first beacon broadcast by a coordinator, the first beacon including a first information element to request the device to perform a channel searching for at least one channel other than a channel that is currently used in the wireless network, the channel comprising a high rate physical channel and a low rate physical channel;

transmit an acknowledgement response to the coordinator, the acknowledgement response indicating that the device will perform the channel searching;

receive a second beacon including information which informs devices in the wireless network that the device is performing the channel searching;

perform the channel searching by estimating a quality of the at least one channel other than the channel that is currently used in the wireless network; and transmit a second information element to the coordinator, the second information comprising a result of the channel searching, the result of the channel searching comprising a status of the at least one channel searched by the device.

\* \* \* \* \*